US011951448B2

(12) United States Patent
Shimizu

(10) Patent No.: US 11,951,448 B2
(45) Date of Patent: Apr. 9, 2024

(54) ROTARY MIXER, BUBBLE SHEAR FILTER, ULTRAFINE BUBBLE GENERATION DEVICE AND ULTRAFINE BUBBLE FLUID MANUFACTURING METHOD

(71) Applicant: SHINBIOSIS CORPORATION, Osaka (JP)

(72) Inventor: Shin Shimizu, Osaka (JP)

(73) Assignee: SHINBIOSIS CORPORATION, Osaka (JP)

( * ) Notice: Subject to any disclaimer, the term of this patent is extended or adjusted under 35 U.S.C. 154(b) by 65 days.

(21) Appl. No.: 17/617,450

(22) PCT Filed: Mar. 22, 2021

(86) PCT No.: PCT/JP2021/011773
§ 371 (c)(1),
(2) Date: Dec. 8, 2021

(87) PCT Pub. No.: WO2021/193559
PCT Pub. Date: Sep. 30, 2021

(65) Prior Publication Data

US 2022/0305449 A1 Sep. 29, 2022

(30) Foreign Application Priority Data

Mar. 27, 2020 (JP) ................................ 2020-057176

(51) Int. Cl.
*B01F 3/04* (2006.01)
*B01F 23/232* (2022.01)
(Continued)

(52) U.S. Cl.
CPC ........ *B01F 33/821* (2022.01); *B01F 23/2323* (2022.01); *B01F 23/237613* (2022.01);
(Continued)

(58) Field of Classification Search
CPC .......... B01F 23/2323; B01F 23/237613; B01F 23/23764; B01F 23/23765; B01F 25/103;
(Continued)

(56) References Cited

U.S. PATENT DOCUMENTS 847,552 A * 3/1907 Carlson ................ F28F 25/082 222/394
1,213,887 A * 1/1917 Krause .................... B01D 1/18 159/48.1
(Continued)

FOREIGN PATENT DOCUMENTS

EP 2492004 A1 8/2012
JP 1994072694 U 10/1994
(Continued)

OTHER PUBLICATIONS

The extended European search report of the corresponding EP application No. 21776667.4 dated Nov. 25, 2022.
(Continued)

*Primary Examiner* — Charles S Bushey
(74) *Attorney, Agent, or Firm* — Muncy, Geissler, Olds & Lowe, P.C.

(57) ABSTRACT

An ultrafine bubble generation device including a gas-liquid mixed fluid generator, a rotary mixer, and a bubble shear filter. The rotary mixer is provided with a hollow part including a vertex inside, including an inflow hole, wherein a groove having a spiral shape is provided in an inner wall surface of the hollow part. The bubble shear filter is provided with a hollow part inside, including an inflow hole for introducing the fluid into the hollow part, wherein the hollow part is tubular, and a plurality of circular plates are arranged perpendicularly to a central axis of the hollow part, and an opening of a type 1 of circular plate and a pointed end portion of a type 2 of circular plate adjacent to the type 1 of
(Continued)

circular plate are arranged to face each other, and connected with a pipeline.

12 Claims, 8 Drawing Sheets

(51) Int. Cl.

| | |
|---|---|
| ***B01F 23/237*** | (2022.01) |
| ***B01F 25/10*** | (2022.01) |
| ***B01F 25/421*** | (2022.01) |
| ***B01F 29/00*** | (2022.01) |
| ***B01F 29/25*** | (2022.01) |
| ***B01F 33/82*** | (2022.01) |

(52) U.S. Cl.
CPC .. *B01F 23/23764* (2022.01); *B01F 23/23765* (2022.01); *B01F 25/103* (2022.01); *B01F 25/4233* (2022.01); *B01F 29/25* (2022.01); *B01F 29/40222* (2022.01)

(58) Field of Classification Search
CPC B01F 25/4233; B01F 29/25; B01F 29/40222; B01F 33/821
USPC ........................................ 261/79.1, 79.2, 113
See application file for complete search history.

(56) References Cited

U.S. PATENT DOCUMENTS 3,641,743 A * 2/1972 Hoffmann ................. B04C 3/00 96/228
4,059,419 A * 11/1977 Ross ...................... B01D 47/10 96/306
5,525,242 A * 6/1996 Kerecz ............ B01F 25/431971 210/220
5,975,503 A * 11/1999 Chuang ............... B01F 25/4322 261/112.1
6,447,158 B1 9/2002 Farkas
6,969,052 B2 * 11/2005 Korzeniowski ....... B01F 25/312 261/76
7,547,002 B2 * 6/2009 Mao ....................... F02M 27/02 261/78.2
8,186,653 B2 * 5/2012 Tsuji ....................... B01F 25/53 261/92
8,302,941 B2 * 11/2012 Nakashima ............. C02F 3/201 261/122.1
2011/0127682 A1 * 6/2011 Burns ................... B01F 25/104 261/34.1
2015/0352505 A1 12/2015 Yokota et al.
2019/0134574 A1 5/2019 Tsuchiya et al.

FOREIGN PATENT DOCUMENTS

| | | | |
|---|---|---|---|
| JP | 2007000848 | A | 1/2007 |
| JP | 2008237995 | A | 10/2008 |
| JP | 2010012454 | A | 1/2010 |
| JP | 2010172800 | A | 8/2010 |
| JP | 2011088079 | A | 5/2011 |
| JP | 2013215634 | A | 10/2013 |
| JP | 2018015715 | A | 2/2018 |
| JP | 2018030094 | A | 3/2018 |
| JP | 2018089628 | A | 6/2018 |
| JP | 2019195783 | A | 11/2019 |
| KR | 10-2010-0138724 | A | 12/2010 |
| WO | 2010095626 | A1 | 8/2010 |
| WO | 2014119775 | A | 8/2014 |
| WO | 2019009357 | A1 | 1/2019 |
| WO | 2019116642 | A1 | 6/2019 |

OTHER PUBLICATIONS

English translation of International Search Report of PCT/JP2021/011773 dated May 25, 2021.
Notification of Reasons for Refusal of the corresponding JP application No. 2021-540446 dated Oct. 5, 2021 and English translation thereof.
Request for the Submission of an opinion of the corresponding KR application No. 10-2021-7038339 dated Feb. 10, 2023.
English translation of Request for the Submission of an opinion of the corresponding KR application No. 10-2021-7038339 dated Feb. 10, 2023.
Office Action of the corresponding JP application No. 2021-197104 dated Feb. 22, 2022 and English translation thereof.

* cited by examiner

[Number Statistics]

| Sample Name | Used Aperture | D10 | D50 (Medium Diameter) | D90 | Average Value |
|---|---|---|---|---|---|
| Sample A | 10um | 0.221 | 0.383 | 0.547 | 0.391 |
| Sample B | 10um | 0.304 | 0.461 | 0.722 | 0.490 |
| Sample C | 10um | 0.219 | 0.374 | 0.553 | 0.383 |
| Tap Water | 10um | 0.206 | 0.233 | 0.296 | 0.249 |

ROTARY MIXER, BUBBLE SHEAR FILTER, ULTRAFINE BUBBLE GENERATION DEVICE AND ULTRAFINE BUBBLE FLUID MANUFACTURING METHOD

TECHNICAL FIELD

The present invention relates to an ultrafine bubble generation device, particularly to an ultrafine bubble generation device or the like in which a method of physically shearing bubbles is used.

BACKGROUND ART

An ultrafine bubble generation device of a rotary shear system is known (e.g., Patent Literature 1). This system is known as a system to shear bubbles contained in gas-liquid mixed water with physical means of rotating blades, and to minimize a bubble size.

CITATION LIST

Patent Literature

Patent Literature 1: International Publication No. WO2019/116642

SUMMARY OF INVENTION

Technical Problem

Conventional devices including Patent Literature 1 have a poor bubble generation efficiency, and it has not been reported that a ratio or concentration of bubbles with a particle size equal to or less than a nano size is as high as that of the present invention.

In view of the above problems, the present inventor has fundamentally reviewed respective constituent components, and has designed an ultrafine bubble generation device including a device configuration different from a configuration of the conventional device, while adopting a system to "physically shear bubbles". That is, technical subjects of the present invention are to provide an ultrafine bubble generation device, and a rotary mixer and a bubble shear filter that are constituent components of the device.

Solution to Problem

A rotary mixer according to the present invention is a rotary mixer provided with a hollow part including a vertex inside, and including an inflow hole for introducing a fluid into the hollow part, and a discharge hole for discharging the fluid, wherein a groove having a spiral shape is provided in an inner wall surface of the hollow part, the groove allowing the fluid introduced from the inflow hole to flow through the groove, and the discharge hole is provided away from a vertex of the spiral shape on an axis of the spiral shape.

Here, "the hollow part including the vertex" specifically has a cannonball shape that is a curved shape with a cross section protruding to one side, and "the spiral shape" means a shape having a turning radius decreasing toward this vertex.

According to the above configuration, the groove with the spiral shape forms a flow path of the fluid, and the fluid is accelerated while turning toward the vertex. Then, after reaching the vertex of the spiral shape, the fluid that has lost place perpendicularly bounces toward the discharge hole on an opposite side while forming a gas-liquid mixed fluid post P, and is fed under pressure toward the discharge hole. Thus, one of main roles of the rotary mixer is to enable smooth acceleration of the fluid without obstruction of flow.

Therefore, it is desirable that the spiral shape of an interior of the rotary mixer is a shape capable of achieving such purpose. In this sense, for "the hollow part including the vertex", a shape of a cross section of a hollow that is "a convex type toward the vertex (top)" such as a cannonball warhead-like shape (cannonball shape) or a quadratic curve is more preferable than a shape of the cross section that is represented by a straight line toward the vertex such as a cone. The shape is, for example, like a quadratic curve lying down and represented by $y=ax^2$ ($a>0$). Further, a shape that is not rotationally symmetric such as a triangular pyramid or a quadrangular pyramid is not preferable because the shape obstructs smooth flow of fluid. Also, for such a shape, in a case where the hollow part or the groove is formed from a bulk-like object through cutting by using a rotary cutting tool, it is also difficult to perform processing. Furthermore, a case where the rotary mixer of the present invention is prepared by a manual operation is also considered, and the cross-sectional shape does not necessarily have to be represented by a formula.

A bubble shear filter according to the present invention is a bubble shear filter provided with a hollow part inside, and including an inflow hole for introducing a fluid into the hollow part, and a discharge hole for discharging the fluid, wherein the hollow part is tubular, and a plurality of thin plates are arranged perpendicularly to a central axis of the hollow part such that the central axis passes through a center point of each circular plate, the thin plates adjacent to each other are provided with a plurality of openings and a plurality of pointed end portions, and a type 1 of thin plate is provided with at least a plurality of openings, a type 2 of thin plate adjacent to the type 1 of thin plate is provided with a plurality of pointed end portions (mountains), and a plurality of openings (valleys) surrounded with adjacent pointed end portions, and an opening of the type 1 of thin plate and a pointed end portion of the adjacent type 2 are arranged to face each other.

The type 1 of thin plate may be further provided with a plurality of pointed end portions (mountains) similar to those of the type 2. In this case, it is preferable that each pointed end portion (mountain) be located at a position facing a respective opening of the type 2 of thin plate.

Note that a reason why each thin plate is the "circular" plate is based on assumption of a configuration where the bubble shear filter usually has a shape of a cylinder, has a "circular" cross section, and functions as a partition wall in the hollow part that is an interior of the cylinder. Therefore, if a body part of the bubble shear filter has a shape other than the cylinder, each thin plate naturally has a shape that fits the shape of the body part. However, an interior of the bubble shear filter is pressurized, and it is therefore considered to be most rational from general viewpoints of ease of processing, pressure loss risk, and manufacturing cost that the bubble shear filter has "the tubular shape" and that each thin plate is "the circular plate" that fits the tubular shape as described later in an after-mentioned embodiment.

The fluid passing through the opening comes in contact with the pointed end portion immediately after passing, and hence bubbles are physically sheared. Note that the shape of the pointed end portion of the above bubble shear filter may be formed through embossing by using an extrusion machine. It is considered that the acuter an angle of the pointed end portion is, the higher a bubble shear effect becomes.

An ultrafine bubble generation device according to the present invention is characterized by a configuration where a gas-liquid mixed fluid generator for generating a gas-liquid mixed fluid is combined with the rotary mixer and the bubble shear filter including the above configurations, and connected with a pipeline.

In the present description, "ultrafine bubbles" mean fine bubbles with a size equal to or less than a nano size (less than 1 μm).

It is preferable that the above ultrafine bubble generation device further include a static flow unit for changing turbulent flow to static flow. In this case, it is preferable that the static flow unit be a magnet. This is because the bubbles in the gas-liquid mixed fluid are negatively charged, and therefore changed to the static flow by an electromagnetic force for movement in a static magnetic field. A stronger magnetic force is more preferable, and when the magnet is a permanent magnet, a neodymium magnet or a magnet that generates a magnetic force of the same degree as or more than that of this neodymium magnet is preferable.

This is because when a turbulent fluid is changed to a static fluid and introduced into the rotary mixer, an initial speed during the introduction tends to be higher, and acceleration of increasing a flow velocity of flow through the spiral shape is further increased, as compared with when the turbulent fluid is introduced as it is.

In this respect, it is considered that an ultrafine bubble generation device disclosed in the above related art literature generates ultrafine bubbles themselves from turbulent flow, and is fundamentally different in mechanism of generation of ultrafine bubbles from a configuration of the present invention where bubbles contained in the fluid generated in the gas-liquid mixed fluid are once changed to static flow, then accelerated and fed under pressure to a downstream side.

Furthermore, the ultrafine bubble generation device according to the present invention may include a plurality of the rotary mixers on the pipeline. In this case, it is preferable that the rotary mixers be configured to have a volume on a downstream side of the pipeline that is smaller than a volume on an upstream side. This is because the smaller the volume is, the more the gas-liquid mixed fluid is accelerated. Furthermore, it is preferable that a pressure on the downstream side be higher. From this viewpoint, if possible, a pipe diameter of a pipe connecting respective units on the downstream side (water sampling port side) may be designed to be smaller.

When another rotary mixer having a volume reduced to a volume of about ¼ is disposed in a subsequent stage and sufficient pressure is applied to increase a flow velocity, micromillimeter-order bubbles remaining in bubbles sheared by the bubble shear filter are further sheared, and a ratio of nanometer-order bubbles can be increased. This is because an inner pressure in a smaller volume is increased, this makes it easier to form a shortened route inside, and rotation is eventually further accelerated.

Also, the ultrafine bubble generation device according to the present invention may be configured such that the rotary mixer is disposed on a downstream side of the above gas-liquid mixed fluid generator, and a flow path (branch path) for introducing a replacement gas different from a gas contained in the gas-liquid mixed fluid is provided upstream of the inflow hole of the rotary mixer. The replacement gas may be, for example, hydrogen, nitrogen or ozone. The gas-liquid mixed fluid may be generated by suddenly introducing the replacement gas into a gas-liquid mixing unit instead of introducing the replacement gas by use of the branch path, but this may be considered to be unfavorable from a viewpoint of bubble stability or the like. Consequently, in an example described later, an example is illustrated where a gas-liquid mixed fluid obtained by mixing air and water is replaced with hydrogen by using, as the gas-liquid mixed fluid generator, a known rotary blower (that is originally designed and prepared by using a pump capable of applying a sufficient pressure), but this is not restrictive.

Advantageous Effect of Invention

Combining a rotary mixer and a bubble shear filter according to the present invention can provide an ultrafine bubble generation device capable of generating ultrafine bubbles having a bubble particle size smaller than in a related art. Furthermore, according to the ultrafine bubble generation device obtained in this manner, ultrafine bubbles with a bubble particle size less than 1 μm, for example, an average particle size on the order from several nm to several hundred nm can be efficiently generated.

DESCRIPTION OF EMBODIMENTS

Hereinafter, description will be made as to embodiments of the present invention with reference to the drawings. However, each of the following embodiments does not provide limited interpretation in recognition of scope of the present invention. Furthermore, the same or similar member is denoted with the same reference sign, and description thereof will not be repeated.

(First Embodiment)—Regarding Basic Configuration—

Figure 1:
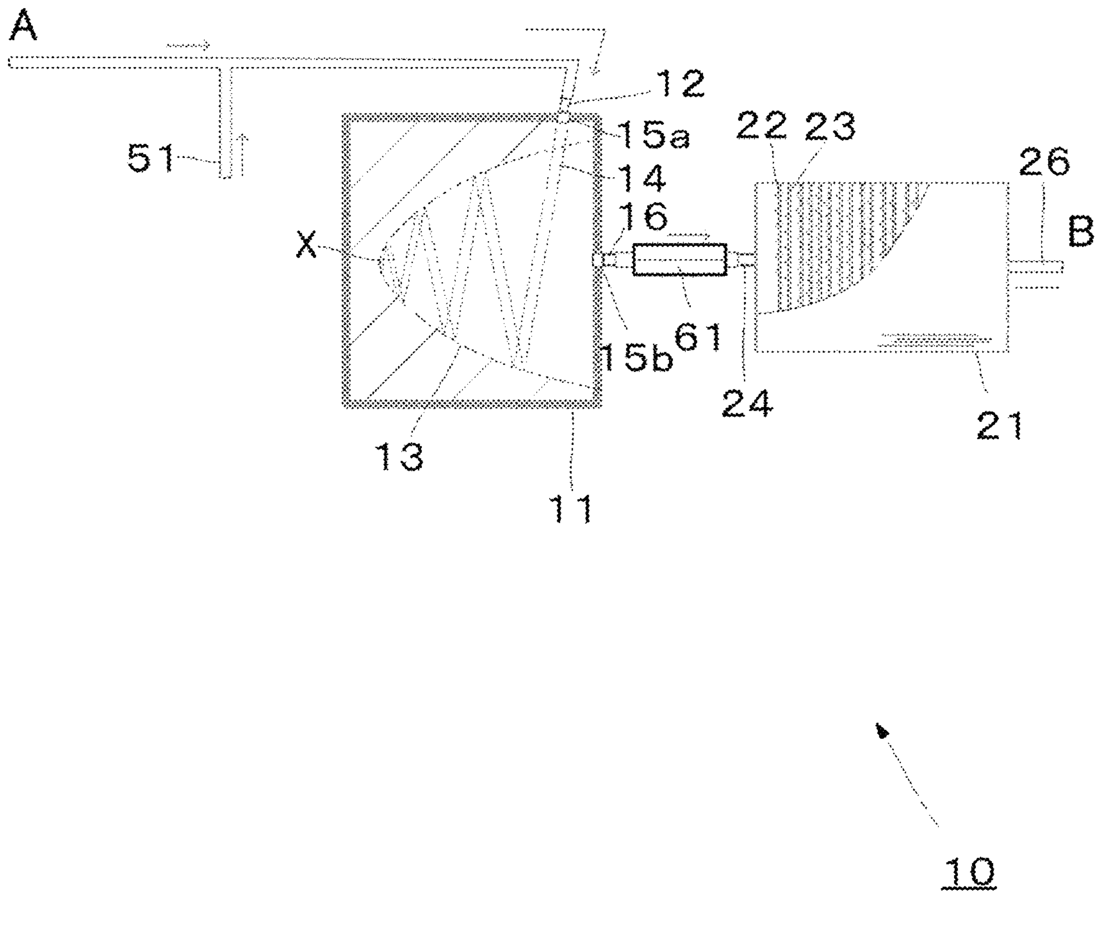
FIG. 1 is a view showing a configuration example of an ultrafine bubble generation device 10 of an embodiment.

FIG. 1 is a view showing a configuration example of an ultrafine bubble generation device 10 of an embodiment.

The ultrafine bubble generation device 10 is configured by connecting a gas-liquid mixed fluid generator 31 (FIG. 4), a rotary mixer 11 (FIG. 2) and a bubble shear filter 21 (FIG. 3) in series with a pipe. For the connection of respective components with the pipe, it is preferable to adopt welding, a flange structure or another structure that decreases pressure loss as much as possible.

A basic concept of the present invention lies in shearing bubbles in a state where a gas-liquid mixed fluid generated by the gas-liquid mixed fluid generator is accelerated to utmost limit.

In a case of the above configuration, when the gas-liquid mixed fluid generated by the gas-liquid mixed fluid generator 31 (FIG. 4) is introduced from point A of FIG. 1 and passed through the rotary mixer 11 and the bubble shear filter 21, the gas-liquid mixed fluid containing a large number of bubbles with a smaller particle size is taken out from point B. The bubbles having a size of several hundreds of micrometers after passing through the rotary mixer 11 pass through the bubble shear filter 21, and are sheared to bubbles on the order from several micrometers to several hundreds of nanometers. An average particle size of finally obtained bubbles decreases with elapse of an operation time. In actuality, finite pressure loss or the like exists when seen from a system of the entire device, and hence the particle size of the bubbles cannot be decreased any more after operation to a certain degree or more, but a lower limit value of the average particle size of the bubbles is not theoretically proven, and it can be therefore considered that bubbles with an infinitely small particle size can be obtained, if a pressure can be infinitely increased and a flow velocity of the fluid can be infinitely increased.

Note that a structure shown in FIG. 1 is a basic configuration, but the structure may be a device configuration where only a required amount of the gas-liquid mixed fluid can be taken out while returning flow of the gas-liquid mixed fluid, or a plurality of rotary mixers 11 having the same volume or different volumes may be provided, as required. Depending on performance of a motor of the gas-liquid mixed fluid generator, an internal pressure of the rotary mixer with a smaller internal volume can be higher, and hence in a case of attaching the rotary mixer with a small volume, it is preferable to attach the mixer to the subsequent stage, but the structure is not necessarily limited to this. Needless to say, a plurality of rotary mixers having the same volume may be provided.

<Rotary Mixer 11>

Figure 2A:
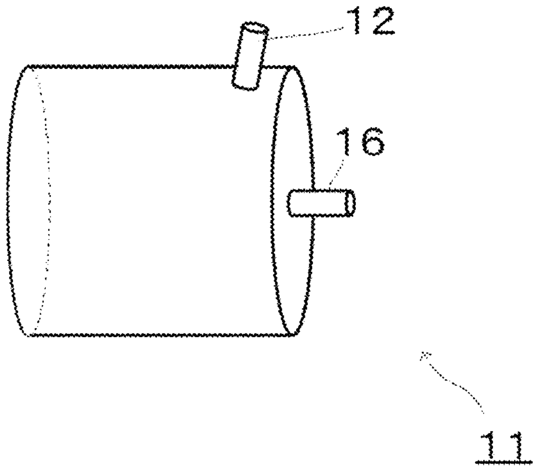
FIG. 2(A) is a view schematically representing an appearance shape of a rotary mixer 11.
Figure 2B:
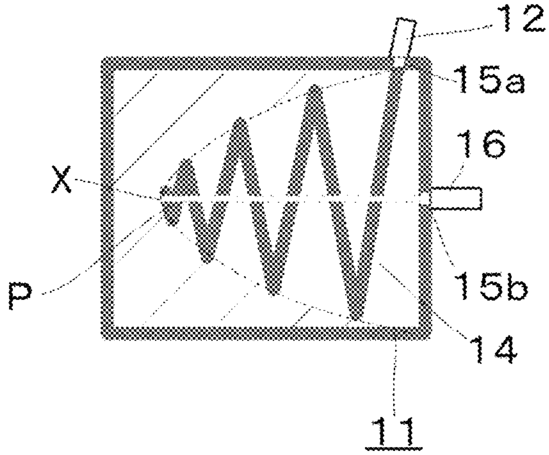
FIG. 2(B) is a view schematically representing a cross-sectional view cut along a plane passing a central axis of a cylindrical shape.

FIG. 2(A) is a view schematically representing an appearance shape of the rotary mixer 11, and FIG. 2(B) is a view schematically representing a cross-sectional view cut along a plane passing a central axis of a cylindrical shape. However, as described later, an aspect ratio (length-to-width ratio) of a cross-sectional shape may not be necessarily correctly represented. As is clear from these drawings, the rotary mixer 11 is a highly sealing structure that does not communicate with the outside except an inflow hole 12 and a discharge hole 16, and is a structure capable of applying a sufficient pressure to an interior of the rotary mixer 11.

For the rotary mixer 11 to be prepared as a prototype, a cylindrical iron ingot is used as a starting material, and first rotated and cut from one end face side by using a lathe, to form a cannonball-shaped hollow part 13 as shown in a cross-sectional view of FIG. 1, and next, a spiral groove 14 is formed in a cuttable minimum size in a wall surface of the hollow part by a manual operation while rotating the whole material. This spiral groove 14 is cut until reaching a vertex X of an innermost portion in a hollow. Next, a through hole 15*a* connecting the inflow hole 12 and the groove 14 is formed, the inflow hole 12 is connected by welding, and finally a disc-like metal plate is fitted in an end face opened by cutting the hollow part, and welded, to obtain a structure where the hollow part 13 is closed. In a central portion of the metal plate, a through hole 15*b* is made in advance and the discharge hole 16 is attached by welding.

Since a high-speed fluid is fed in the rotary mixer 11 under a high pressure, the rotary mixer 11 is prepared by cutting the cylindrical iron ingot in consideration of durability, strength, ease of processing and the like, but does not have to be made of iron as long as it is capable of withstanding the high pressure, and a preparing method other than a method of cutting a bulk-like (ingot-like) object with a cutting device may be used. A highly airtight and watertight structure is preferable where an internal pressure can be sufficiently increased (structure where only the inflow hole 12 and the discharge hole 16 that are sufficiently smaller than a volume of the hollow part 13 communicate with the outside), and a structure is preferable where there are no obstacles to resist in the inflow hole 12, the through hole 15*a*, the groove 14, the through hole 15*b* and the discharge hole 16 that form a flow path so that the gas-liquid mixed fluid can be accelerated inside, and the fluid can accordingly smoothly flow.

When the gas-liquid mixed fluid is introduced into the rotary mixer 11 through the inflow hole 12, the fluid is accelerated through the spiral groove 14 that is the fluid flow path, while turning toward the vertex X. Then, after reaching the vertex X of the spiral shape, the fluid that has lost place is fed under pressure toward the discharge hole on an opposite side while forming a gas-liquid mixed fluid post P.

Also, a shape of a cross section of the hollow that is "a convex type toward the vertex (top)" such as a cannonball warhead-like shape (cannonball type) or a quadratic curve is more preferable than a shape of the cross section that is represented by a straight line toward the vertex such as a cone for resisting a centrifugal force caused by the turning. The shape is, for example, like a quadratic curve lying down and represented by $y=ax^2$ $(a>0)$. Further, a shape that is not rotationally symmetric such as a triangular pyramid or a quadrangular pyramid is not preferable because the shape obstructs smooth flow of the fluid. Also, for such a shape, in a case where the hollow part or the groove is formed from the bulk-like object through cutting by using a rotary cutting tool, it is also difficult to perform processing. Furthermore, a case where the rotary mixer is prepared by a manual operation is also considered, and the cross-sectional shape does not necessarily have to be represented by a formula.

Therefore, it is desirable that the spiral groove 14 formed in the rotary mixer 11 has a shape capable of achieving such a purpose. In this sense, "the hollow part including the vertex (X)" is to be interpreted purposefully in line with the above explanation.

Figure 2C:
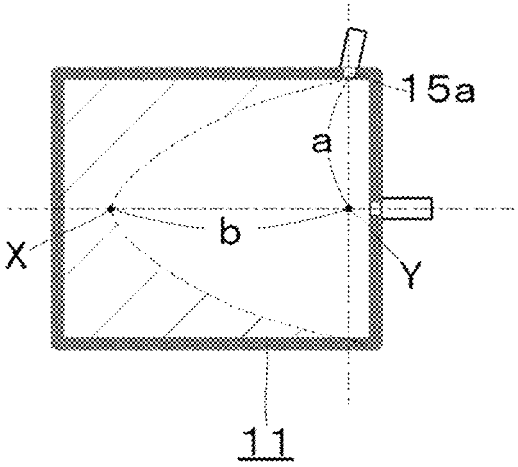
FIG. 2(C) is a view in which a perpendicular line passing through a through hole 15*a* and a central axis of a cylinder are added to the cross-sectional view of FIG. 2(B).

Here, description is made as to the shape of the rotary mixer 11 with reference to FIG. 2(C).

FIG. 2(C) is a view in which a perpendicular line passing through the through hole 15*a* and a central axis of a cylinder are added to the cross-sectional view of FIG. 2(B). It is defined that an intersection point between the perpendicular line and the central axis is Y, a distance from the through hole 15*a* to the intersection point Y is a, and a distance from the vertex X to the intersection point Y is b. One of main roles of the rotary mixer is to enable smooth acceleration of the fluid without obstruction of flow, but in an experiment by the present inventors, a comparatively preferable result was obtained in a case where a ratio of the distances a:b was generally about 1:4 as long as a pressure sufficient to form the gas-liquid mixed fluid post P was applied.

<Bubble Shear Filter 21>

Figure 3A:
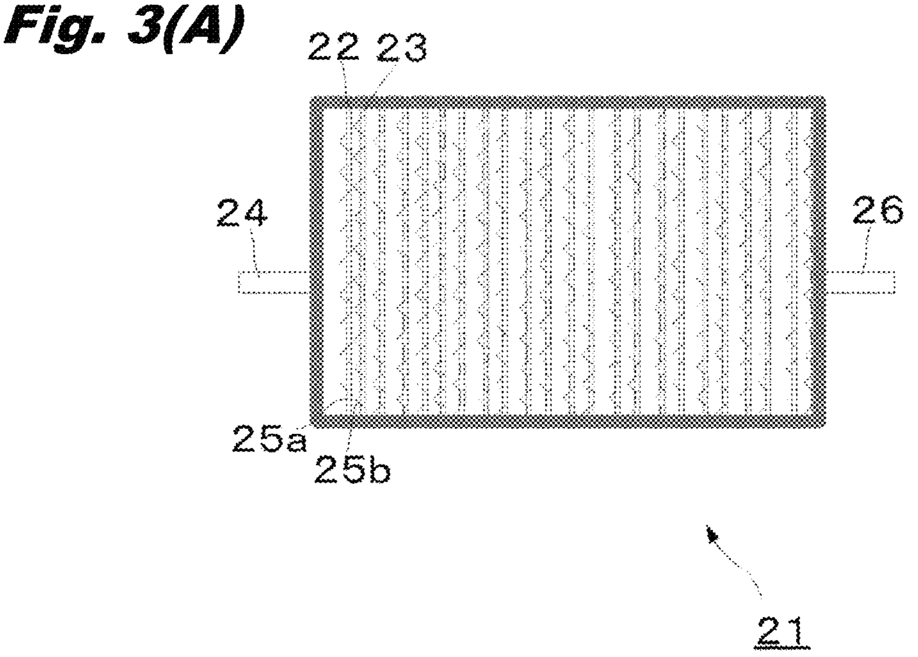
FIG. 3(A) is a view showing an internal structure of a bubble shear filter 21 with a hollow cylindrical shape, and a view schematically representing a cross-sectional view cut along a plane passing a central axis of the cylindrical shape.
Figure 3B:
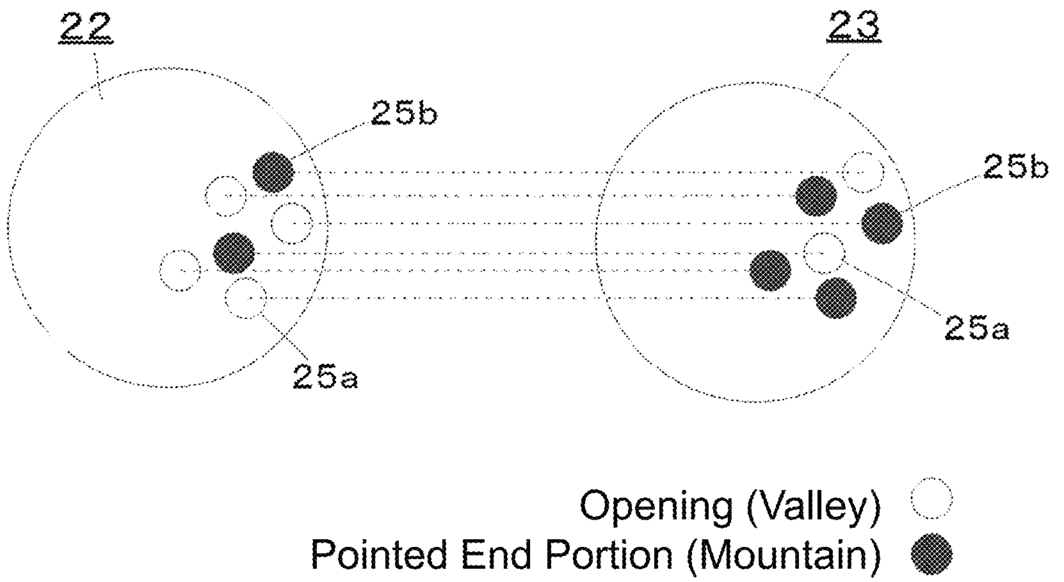
FIG. 3(B) is a view representing two types of thin plates 22 and 23 arranged in the bubble shear filter 21 from a plane.

FIG. 3(A) is a view showing an internal structure of the bubble shear filter 21 with a hollow cylindrical shape, and a view schematically representing a cross-sectional view cut along a plane passing a central axis of the cylindrical shape. FIG. 3(B) is a view representing two types of thin plates 22 and 23 arranged in the bubble shear filter 21 from a plane.

As shown in FIG. 3(A), the bubble shear filter 21 is a hollow structure provided with a hollow part disposed inside, and includes an inflow hole 24 for introducing the fluid into the hollow part, and a discharge hole 26 for discharging the fluid. The hollow part is tubular, and a type 1 of thin plates 22 and a type 2 of thin plates 23 are alternately arranged perpendicularly to the central axis of the hollow part such that the central axis passes through a center point of each circular plate. In each of the type 1 of thin plates 22 and the type 2 of thin plates 23, a plurality of openings 25*a* and a plurality of pointed end portions 25*b* (mountains) are arranged to face each other. Their patterns are slightly offset from each other in planar view. In addition, the type 1 of thin plates 22 require at least a plurality of openings 25*a*, but the pointed end portions 25*b* are not absolutely required. However, as shown in FIG. 3(A) and FIG. 3(B), the type 1 of thin plates 22 may have both the opening 25*a* and the pointed end portion 25*b*. It is considered that the greater the number of the pointed end portions 25*b* is, the higher a bubble shear effect of the bubble shear filter 21 becomes. In this case, it is preferable that each pointed end portion (mountain) 25*b* of the type 1 of thin plate 22 be located at a position facing a respective opening of the type 2 of thin plate 23.

There are not any special restrictions on an installation order, and type 1, type 2, type 1 and type 2 may be installed in this order, or type 2, type 1, type 2 and type 1 may be installed in this order. There are not any special restrictions on the number of thin plates, and the number is, for example, from 2 to 20 (in a case where type 1 and type 2 form one set, the number of sets is from one to ten).

As the number of the thin plates increases, the bubble shear effect improves, but a pressure in the bubble shear filter 21 increases and rate controlling is performed, and hence the number of the thin plates is to be comprehensively determined in consideration of output of a pump, pressure resistance of the whole flow path (pipeline) including respective units such as the bubble shear filter and the like, a required bubble size, and a required bubble fluid extraction speed.

Note that as to a shape of the thin plate, instead of preparing two types of different thin plates in advance as described above, thin plates having the same shape (same outline and size) may be offset from each other and arranged such that each opening faces a respective pointed end portion. In this case, a top and bottom do not fit a little, and hence adjustment is required for this case.

FIG. 3(B) shows that the type 1 of thin plate 22 and the type 2 of thin plate 23 are extracted and juxtaposed in the plane. It is understood from this drawing that when two thin plates are superimposed, each opening 25*a* and a respective pointed end portion 25*b* are aligned at the same position. The pointed end portion 25*b* has a role of physically shearing bubbles passed through the opening 25*a*, and it is therefore preferable that a most pointed portion of the pointed end portion has a sharply pointed shape like a needle tip and that a vertex of each pointed end portion 25*b* is located in a center of a respective opening 25*a*. Furthermore, when the thin plates are arranged in the hollow part of the bubble shear filter 21, the thin plates may be evenly arranged with a certain distance therebetween.

To dispose each pointed end portion 25*b* in the thin plate, "an embossing method" performed by a press machine using a die with sharp projection may be employed. This is because according to this method, a large number of pointed end portions can be easily formed at once. However, there are not any special restrictions on a processing method of the thin plate. Further, there are not any special restrictions on sizes and numbers of the openings 25*a* and the pointed end portions 25*b*.

In the prototype, a thin plate made of stainless steel and having a diameter of 12 cm and a thickness of 0.2 mm was pressed to obtain type 1 with a press machine, the die was then slightly displaced to prepare type 2, the type 1 of thin plate was formed in a shape provided with 40 pointed end portions 25*b* (mountains) and 40 openings 25*a* (valleys) per plate, and the type 2 of thin plate was similarly formed in a shape provided with 40 pointed end portions 25*b* (mountains) and 40 openings 25*a* (valleys) (40 mountains and valleys each) that are slightly offset from those of the type 1 of thin plate. When both the plates are superimposed, each mountain fits into a respective valley.

In the prototype, inside a hollow part with an inner diameter of about 11.4 cm, the above two types of thin plates 23 and 24 were arranged as a set of two plates, and twelve thin plates in total (2×6 sets) were arranged at intervals of about 0.7 cm.

When the gas-liquid mixed fluid passes through the bubble shear filter 21, most microbubbles in the gas-liquid mixed fluid are crushed, and nanobubbles with a smaller particle size are generated.

<Gas-Liquid Mixed Fluid Generator>

Figure 4:
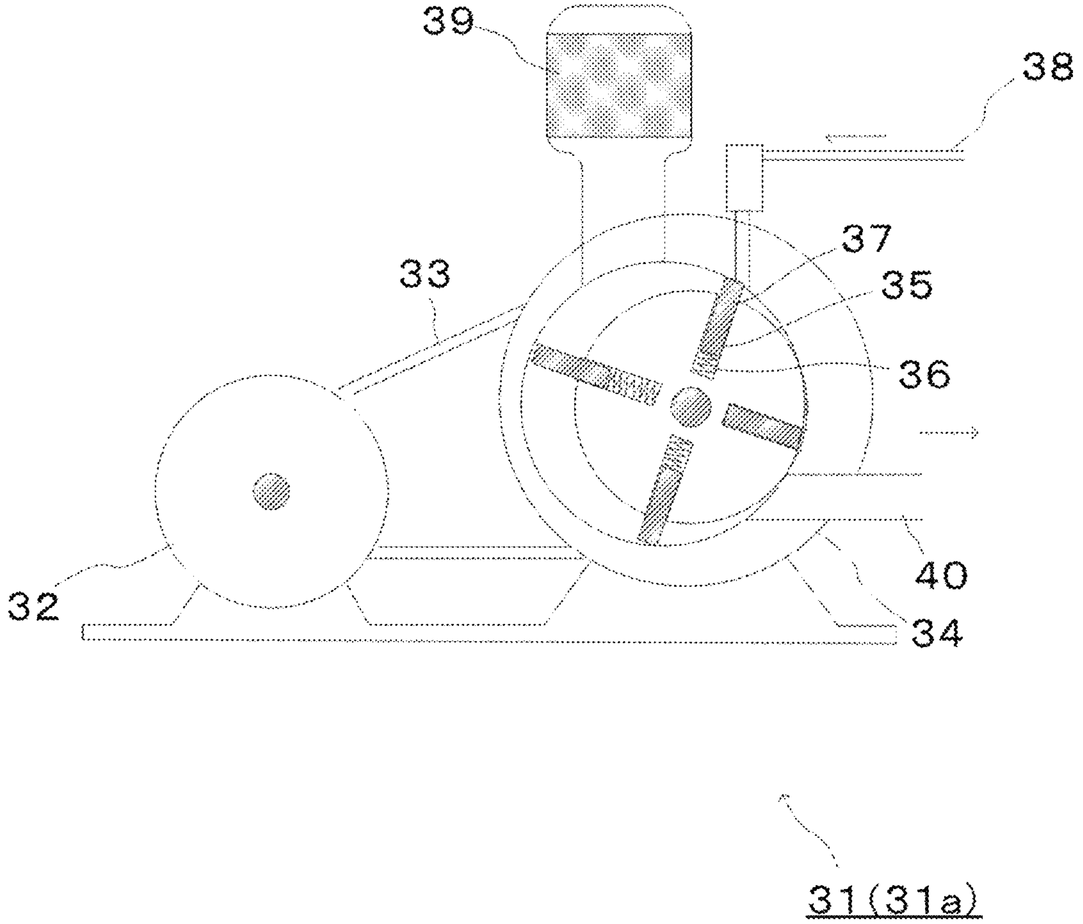
FIG. 4 is a view showing a device configuration of a PSPZ type (naturally aspirated type) of pressurized rotary blower 31*a* as an example of a gas-liquid mixed fluid generator 31.

FIG. 4 is a view showing a device configuration of a PSPZ type (naturally aspirated type) of pressurized rotary blower 31*a* as an example of the gas-liquid mixed fluid generator 31. The rotary blower 31*a* functions as the gas-liquid mixed fluid generator 31 in the ultrafine bubble generation device 10 of the present embodiment. When a rotary pump 32 rotates, power is transferred to a belt 33, and a turntable 34 of the rotary blower 31*a* rotates. A groove 35 is provided in the turntable 34, and a spring 36 and a gate valve 37 are provided in the groove 35. The gate valve 37 is always pressed by the spring 36. When the turntable 34 rotates in a tubular hollow part eccentric from a center of a rotary shaft, the gate valve 37 protrudes or is pushed back into the groove 35 depending on a distance from a wall surface.

On the other hand, a water intake port 38 to take in a fluid (usually water) and an air inflow hole 39 to take in a gas (usually air) are connected to the hollow part, and the gas (e.g., air) and fluid (e.g., water) are sequentially fed into a chamber partitioned by the gate valve 37. Then, the pump operates to apply a pressure, the gas is forcibly taken as bubbles into a liquid, and gas-liquid mixed water is discharged from a gas-liquid mixed water outlet 40.

The water intake port 38 is connected to the discharge hole 26 of the bubble shear filter 21 through a pipeline (not shown in the drawing), and configured to return flow of gas-liquid mixed water, while configured to sample only a required amount of water.

The rotary pump 32 applies a high water pressure to the gas-liquid mixed water discharged from the gas-liquid mixed water outlet 40. It is preferable that the water be fed to the rotary mixer 11 through a pipe connected to the gas-liquid mixed water outlet 40 and having a cross-sectional area smaller than that of the gas-liquid mixed water outlet 40. This is because when the gas-liquid mixed water outlet 40 is connected to the pipe having the cross-sectional area smaller than that of the gas-liquid mixed water outlet 40, a pressure in the pipe increases, and flow velocity can be increased. The gas-liquid mixed fluid having the flow velocity increased in the rotary mixer 11 is forcibly pushed into the bubble shear filter 21 still in a state where the high water pressure is applied to the fluid.

At the time of the discharge from the rotary mixer 11, bubbles have a particle size from micrometers to nanometers.

Note that the rotary blower 31*a* that is commercially available may be used. However, in a case of aiming to generate ultrafine bubbles with a particle size less than 1 μm, the gas-liquid mixed fluid needs to be pressurized to the utmost limit and accelerated, and it is therefore necessary to use a rotary blower with an extremely large pump output. The present inventor prepared a prototype by use of a pressurized blower pump (150 L/m). It is preferable to change performance of the pressurized blower pump depending on use application. For example, in a case where a large type of rotary blower, such as a car-mounted type rotary blower, is mounted, the pressurized blower pump with output performance of 200 L/m may be used.

For the fluid to be introduced, in a case of introducing a replacement gas, the fluid to be taken inward from the water intake port 38 acts as "a carrier fluid". As the carrier fluid or a raw material thereof, purified water (distilled water), saline or the like may be used, and alternatively, well water or tap water may be used.

Also, in a case of adopting a device configuration to change turbulent flow to static flow by a magnetic field, it is preferable to use, as the carrier fluid, reverse osmosis membrane water (RO water) containing, as a salute, minerals (cations) extracted from charcoal, bamboo charcoal, granite or the like. Cations are taken into bubbles in the fluid, and the bubbles form negatively charged particles outside, so that when moving at high speed, the bubbles tend to receive an electromagnetic force.

<Regarding Change to Static Flow>

Inside the rotary mixer 11, the gas-liquid mixed fluid is accelerated while passing through the spiral groove 14 under a high pressure, and hence the fluid in a turbulent state is discharged from the discharge hole 16. At this time, the fluid passed under a strong static magnetic field can be changed from turbulent flow to static flow. Particularly, when the charged particles containing minerals in bubbles and rotating or vibrating still with high energy in a random direction pass through the static magnetic field, the particles are changed to a low energy state by the electromagnetic force. As a result, the bubbles are aligned in one direction in the gas-liquid mixed fluid, and can be changed from turbulent flow to static flow. Then, the gas-liquid mixed fluid changed from the turbulent state to the static flow further tends to accelerate.

On a pipeline connecting the rotary mixer 11 and the bubble shear filter 21 in FIG. 1, a static flow unit 61 is attached. The static flow unit 61 is equipment that generates a static magnetic field, and for example, a permanent magnet is usable. A stronger magnetic force is more preferable in that an action of changing turbulent flow to static flow is enhanced. It is preferable that the permanent magnet be a neodymium magnet or a magnet that generates a magnetic force of the same degree as or more than that of the neodymium magnet, but this is not restrictive, and for example, a direct current driven electromagnet may be used.

Figure 5A:
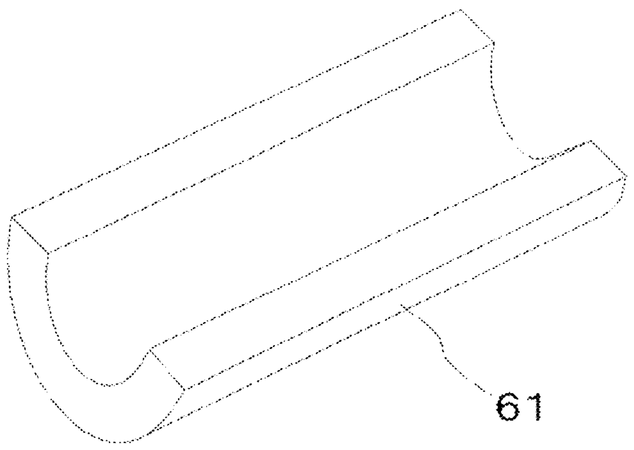
FIG. 5(A) and FIG. 5(B) are views each showing a structure of a static flow unit 61 attached to cover a pipeline.
Figure 5B:
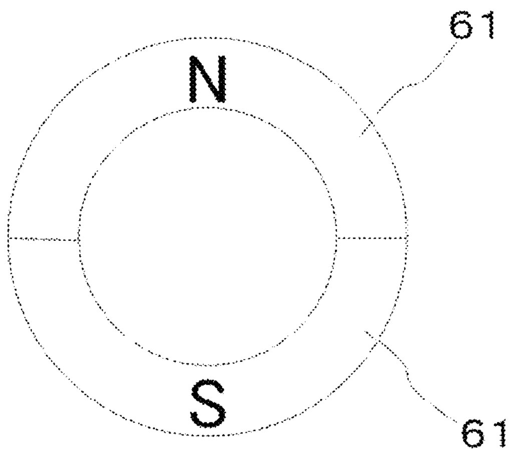

Each of FIG. 5(A) and FIG. 5(B) is a view showing a structure of the static flow unit 61 attached to cover the pipeline. In the prototype, two curved pieces of neodymium magnet (with a thickness of 7 mm, a width of 1.5 cm, and a length of 4 cm) were installed to face each other, to form the static flow unit 61 as in FIG. 5(A). Note that in the actual prototype, a magnet that precisely fitted with the pipeline was not obtained, and hence both pieces were fixed to face each other via a slight clearance in a state of being closely attached to the pipeline with fasteners. Note that a structure for the static flow unit to change turbulent flow to static flow is based on the electromagnetic force acting on the charged particles, and the same principle as in a line filter to be attached to a power cord is adopted.

<Regarding Replacement Gas>

As a gas component to be encapsulated in ultrafine bubbles, hydrogen gas, ozone gas or the like may be used depending on the use application. Even in this case, in the gas-liquid mixed fluid generator 31, air is first mixed in the carrier fluid (e.g., water or RO water described above), and then at least part of air is replaced with another gas to generate the fluid. A reason for this is that even if hydrogen is to be mixed from the beginning, hydrogen bubbles might be dissolved in water or the hydrogen gas might easily dissipate into the atmosphere, and hence the gas-liquid mixed fluid cannot be efficiently obtained.

At the point A in FIG. 1, the gas-liquid mixed fluid discharged from the gas-liquid mixed fluid generator 31 flows toward the inflow hole 12 of the rotary mixer 11 in a direction shown with arrows in the drawing. At this time, a replacement gas such as hydrogen may be introduced from a branch path 51.

In a case where water containing cations is carrier water and a flow velocity is constant, bubbles contained in the gas-liquid mixed fluid exist in a state of being polarized to plus charges and minus charges (electrons). Positively charged hydrogen molecules (molecules equal to or more than 17%) are to preferentially intrude into and pass through low pressure dissolved air due to high pressure solvent. Above all, the hydrogen molecules are easily positively charged due to the polarization of the electrons, and are therefore blocked by cations contained in the carrier fluid, to theoretically inflate the bubbles very slightly without being able to permeate and escape. In other words, water containing bubbles with a millimeter size, a micrometer size and a nanometer size flows toward the bubble shear filter as bubbles containing hydrogen, bubbles that do not contain hydrogen, and gas-liquid mixed water separated to the bubbles and dissolved hydrogen. In a flow path, some rotationally sheared bubbles (milli bubbles, microbubbles, micro nanobubbles and the like) are crushed in a stage where the structure cannot be held, to form dissolved bubbles with a nano size close to a micro size. There are not any special restrictions on the replacement gas, and hence a gas other than hydrogen, for example, ozone or nitrogen may be used.

(Second Embodiment)—Ultrafine Bubble Generation Device—

Figure 6:
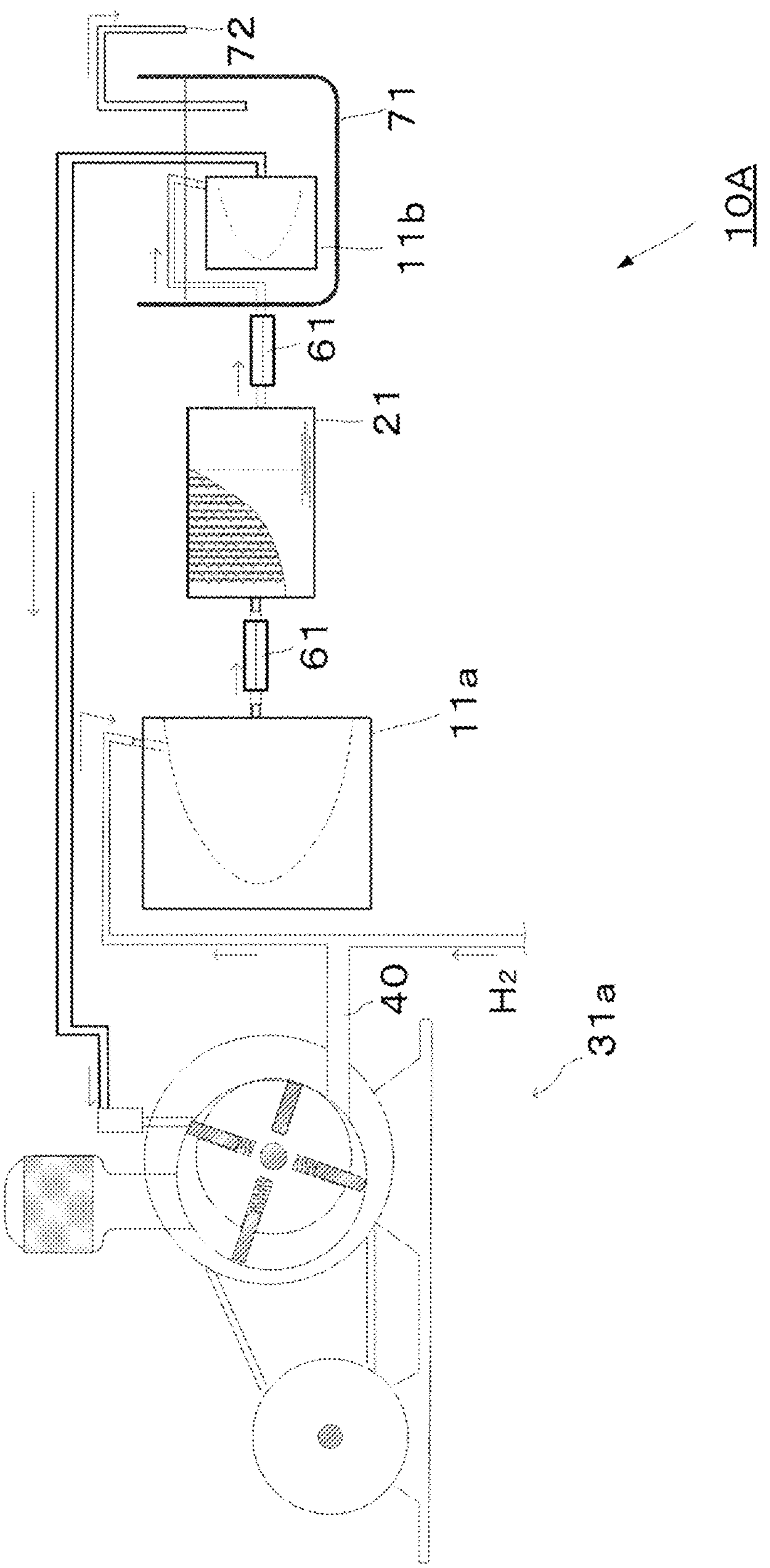
FIG. 6 illustrates a configuration example of a practical ultrafine bubble generation device 10A.

FIG. 6 illustrates a configuration example of a practical ultrafine bubble generation device 10A prototyped as an experimental machine. A rotary blower 31*a*, a first rotary mixer 11*a*, a bubble shear filter 21 and a second rotary mixer 11*b* are connected in this order with a pipeline. Then, the second rotary mixer 11*b* is configured to return flow along the pipeline to the rotary blower 31*a*. Here, a configuration is adopted where a secondary mixer itself is submerged in a product tank 71 for supply as a product, water can be sampled from a water sampling port 72 when necessary, and all flow of remaining water is returned to the rotary blower 31*a*.

The device is also configured such that hydrogen gas is merged as replacement gas in a flow path connecting to a gas-liquid mixed water outlet 40.

Respective units have specifications as follows.

Rotary blower: NIKUMI pressurized blow pump (150 L/m) 25PSPZ

First rotary mixer: a volume of 400 ml

Second rotary mixer: a volume of 100 ml

Gas shear filter: a volume of 500 ml

Carrier water: RO water with mineral (cation) as a solute

Room temperature 20° C.

When the ultrafine bubble generation device 10A was operated for one hour, water temperature rose to 40° C. To hold bubbles in water for a long period of time, water at a lower temperature is more preferable. Water immediately after sampled is in a white turbid state where milli bubbles, microbubbles and nanobubbles are mixed, but water left to stand for about two to three minutes gradually becomes transparent from the bottom. What is left last is ultrafine bubble water.

As an operation starts, a particle size of bubbles contained in the finally obtainable ultrafine bubble water decreases. After the operation continued for one hour at minimum, 24 hours in the present example, the ultrafine bubble water was taken outside and measured.

<Ultrafine Bubble Water Performance Evaluation (Experiment Conditions)>

Measurement date: Mar. 11, 2020

Measurement method: electromagnetic resistance method (in conformity to IS013319)

Measurement mode: quantitative mode (suction of 100 μL) (count the number per ml)

Sample adjustment: ISOTON II (electrolytic solution) of 200 ml each sample of 20 ml (*diluted 10 times)

Aperture diameter: 10 μm (measurement limit particle size of 0.2 μm)

Measurement device: precision particle size distribution measurement device

Multisizer 4e manufactured by Beckman Coulter, Inc.

With this device, particle size distributions of a number, volume and area of particles can be simultaneously measured in a range from 0.2 μm to 1600 μm by using Coulter principle known as an electrical sensing zone method. The Coulter principle refers to a principle indicating that, when a certain amount of electrolytic solution is run into a tube (manometer) provided with a fine conductive vacancy (aperture), electrodes are installed in an interior and exterior of the manometer to apply a direct current voltage (plus to an internal electrode and minus to an external electrode) and when the particles pass through a sensing zone (aperture sensitive region), electrical resistance between two electrodes changes in proportion to the size (volume) of the particles. The number and volume of the particles can be simultaneously measured by detecting and amplifying this change in electrical resistance.

Figure 7:
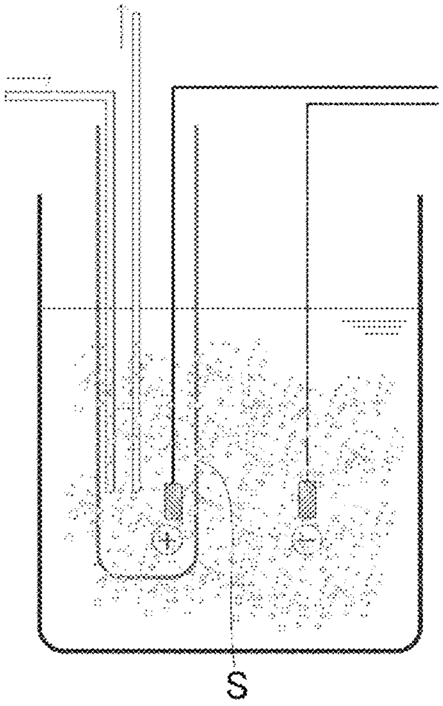
FIG. 7 is a view schematically showing a measurement principle of an electrical sensing zone method.

FIG. 7 is a view schematically showing a measurement principle of the electrical sensing zone method. While the electrolytic solution is supplied at a constant speed into the manometer, the electrolytic solution is suctioned and circulated at a constant speed with a metering pump. At this time, the number, volume and the like of the particles passed through an aperture S of the manometer are simultaneously measured. It is considered that bubbles of ultrafine bubble water containing the bubbles with a size less than a micrometer size are transparent, and hence scattered light cannot be obtained, which makes it difficult to accurately perform measurement with a measurement device in which laser light is used, but in Coulter principle, there is an advantage of being able to accurately measure the size and concentration.

<Measurement Result>

Sample A: water sampling date early December, 2010 (hydrogen replacement)

Sample B: water sampling date Mar. 2, 2019 (hydrogen replacement)

Sample C: water sampling date Feb. 14, 2020 (hydrogen replacement)

Tap water: water sampling date Mar. 11, 2020

Each of Sample A to Sample C was manufactured by using the ultrafine bubble generation device 10A described as the second embodiment with reference to FIG. 6. As carrier water, reverse osmosis membrane water (RO water) containing mineral (cation) as a salute was used, and a replacement gas of hydrogen was used. The respective samples are manufactured by using the same device, but are different in manufacturing time.

Sample A is a sample first measured after an experimental machine was prepared, and is a sample about nine years (about nine years and three months) before the measurement date. Sample B is a sample of water sampled about one year before the measurement date, Sample C is a sample of water sampled nine days before the measurement date, and tap water is tap water sampled and measured for reference on the measurement date.

Naturally, tap water does not contain any ultrafine bubbles, but when measured with this measurement device, a particle number of particles mixed in tap water is measured. Samples A, B and C diluted 4000 times with degassed water (the samples diluted about 400 times and further diluted 10 times and measured) were used. This was because a large number of bubbles existed in ultrafine bubble water (Samples A, B and C) generated with the device of the present embodiment to such an extent that the samples could not be measured unless diluted 4000 times. Note that degassed water obtained by a method of applying a negative pressure to tap water being run and storing water in a flask was used for the dilution.

The number of ultrafine bubbles of an undiluted solution before diluted 4000 times for each sample is as follows.

A measured value of the number of the bubbles contained in each of Samples A to C is as follows.

Sample A: measured value 58026 bubbles/ml

Sample B: measured value 412198 bubbles/ml

Sample C: measured value 168464 bubbles/ml

Furthermore, since each sample is diluted 4000 times as described above, the number of the bubbles before diluted is estimated as a result.

Sample A (undiluted solution): 58026×4000=232,104,000 bubbles/ml

Sample B (undiluted solution): 412198×4000=1,648,000,000 bubbles/ml

Sample C (undiluted solution): 168464×4000=673,856,000 bubbles/ml

In addition, it is considered that a reason why the measured value of Sample B is relatively large is related to a detection limit of the measurement device, and details of the consideration will be described later.

Figures 8A, 8B:
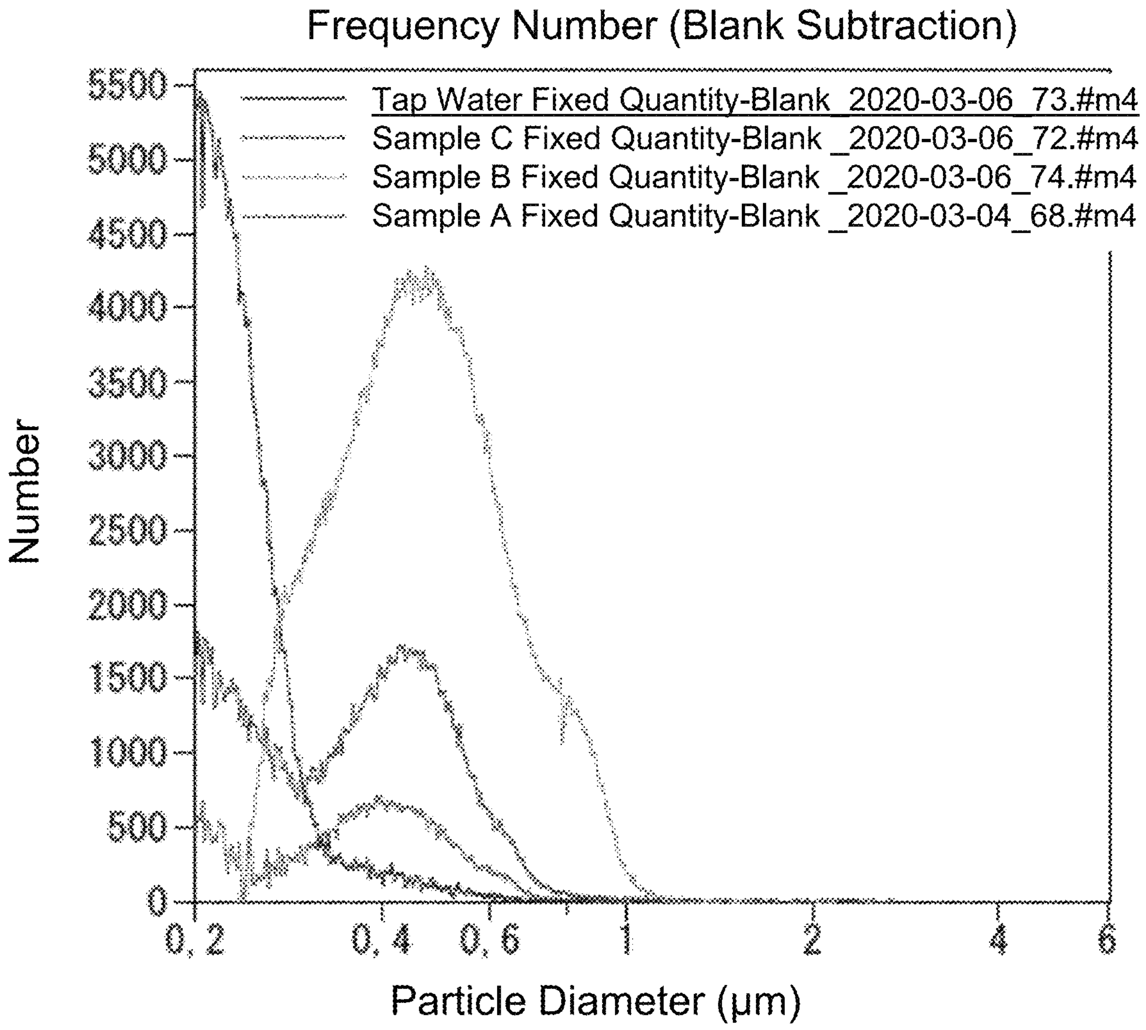
FIG. 8(A) is a figure showing measurement results of Samples A to C.
FIG. 8(B) is a figure representing number statistics to each sample and tap water in a table.

FIG. 8(A) is a figure showing the measurement results of Samples A to D. Also, FIG. 8(B) is a figure representing number statistics to each sample and tap water in a table.

In FIG. 8(A), ordinate indicates the number of the bubbles, and abscissa indicates a particle diameter (from 0.2 μm to 6 μm). This graph is displayed by uniformly subtracting blanks (data obtained by measuring only the electrolytic solution). The blanks are subtracted to eliminate effect of particles that exist in the electrolytic solution added when diluting the sample. As described above, Sample B has a larger peak around 0.4 μm, and a larger number of bubbles as compared with Samples A and C, and it is therefore considered that probability of particles around 0.2 μm being counted is smaller than probabilities in the other samples A and C and that the particle number is underestimated. On the other hand, some of ultrafine bubbles have properties that the bubbles combine and increase in size with elapse of time. Particles having a particle size equal to or less than a measurement limit particle size are not measured, and it is therefore considered that while the particle size of the bubbles increases with the elapse of time and thus the number of bubbles decreases in absolute terms, the particle size becomes measurable and hence the number of bubbles detected as the measured value rather increases. Furthermore, a large number of fine particles equal to or less than the detection limit dissolve and disappear by self-pressurization, and the effect of the decrease in the number of bubbles cannot be ignored. Therefore, as increase and decrease in the number of the bubbles over time are intertwined with complex factors, it is therefore difficult to discuss quantitatively, and definition cannot be made unconditionally.

That is, as to Sample B, it looks like there are no particles around 0.2 μm on display when the blank is subtracted, but it is considered that in actuality, the particles in a range from 0.2 to 0.4 μm surely exist in the same manner as in Samples A and C.

In conclusion, it is suggested as a result that Sample B is different from Samples A and C in the absolute number of the bubbles, and relative distribution does not change that much as compared with Samples A and C.

<Use Example>

As described above, according to the ultrafine bubble generation device of the present embodiment, ultrafine bubble water containing various gases (not especially limited, but containing, for example, hydrogen, oxygen, ozone, nitrogen or the like) can be generated, and the present invention can be therefore used in wide range of fields of drinking water, cleaning water, treatment aids for medical and dentistry, hydroponics, toners, industrial materials, energy development and the like.

INDUSTRIAL APPLICABILITY

According to an ultrafine bubble generation device of the present invention, ultrafine bubbles can be efficiently generated, and hence industrial applicability is extremely high.

REFERENCE SIGNS LIST

10 ultrafine bubble generation device
11 rotary mixer
12 inflow hole
13 hollow part
14 groove
15 (15*a* and 15*b*) through hole
16 discharge hole
21 bubble shear filter
22 type 1 of thin plate
23 type 2 of thin plate
24 inflow hole
25*a* pointed end portion
25*b* opening
26 discharge hole
31 gas-liquid mixed fluid generator
31*a* rotary blower
32 rotary pump
33 belt
34 turntable
35 groove
36 spring
37 gate valve
38 water intake port
39 air inflow hole
40 gas-liquid mixed water outlet
51 branch path
61 static flow unit
71 tank
72 water sampling port

The invention claimed is:

1. An ultrafine bubble generation device comprising a gas-liquid mixed fluid generator for generating a gas-liquid mixed fluid, a rotary mixer, and a bubble shear filter,
- the rotary mixer being provided with a hollow part including a vertex inside, and comprising an inflow hole for introducing a fluid into the hollow part, and a discharge hole for discharging the fluid, wherein
  - a groove having a spiral shape is provided in an inner wall surface of the hollow part, the groove allowing the fluid introduced from the inflow hole to flow through the groove, and
  - the discharge hole is provided away from a vertex of the spiral shape on an axis of the spiral shape,
- the bubble shear filter being provided with a hollow part inside, and comprising an inflow hole for introducing the fluid into the hollow part, and a discharge hole for discharging the fluid, wherein
  - the hollow part is tubular, and a plurality of circular plates that are in a circular plate shape, are arranged perpendicularly to a central axis of the hollow part such that the central axis passes through a center point of each of the circular plates,
  - the circular plates adjacent to each other are provided with a plurality of openings and a plurality of pointed end portions, and
  - an opening of a type 1 of plate, which is selected from the circular plates, and a pointed end portion of a type 2 of plate, which is selected from the circular plates and different from the type 1 of plate, adjacent to the type 1 of plate are arranged to face each other, and connected with a pipeline.

2. The ultrafine bubble generation device according to claim 1, further comprising a static flow unit for changing turbulent flow to static flow.

3. The ultrafine bubble generation device according to claim 2, wherein the static flow unit is a magnet.

4. The ultrafine bubble generation device according to claim 1, comprising:
- a plurality of the rotary mixers on the pipeline.

5. The ultrafine bubble generation device according to claim 4, wherein the plurality of rotary mixers have a volume on a downstream side of the pipeline that is smaller than a volume on an upstream side.

6. The ultrafine bubble generation device according to claim 1, wherein the rotary mixer is disposed on a downstream side of the gas-liquid mixed fluid generator, and a flow path for introducing a replacement gas different from a gas contained in the gas-liquid mixed fluid is provided upstream of the inflow hole of the rotary mixer.

7. The ultrafine bubble generation device according to claim 1, wherein the circular plates have an outer peripheral that fits to an inner peripheral of the hollow part.

8. A rotary mixer for accelerating a gas-liquid mixed fluid comprising:

a hollow part formed rotationally symmetrically around a central axis;

an inflow hole for introducing the gas-liquid mixed fluid into the hollow part;

a groove having a spiral shape and formed on an inner wall surface of the hollow part, the groove reaching from the inflow hole to a vertex of the hollow part; and a discharge hole for discharging the gas-liquid mixed fluid in the hollow part to the outside of the hollow part; wherein a cross-sectional shape of the hollow part cut along the central axis is a convex shape represented by a curved line toward the vertex of the hollow part on the central axis, and the inflow hole is inclined relative to a perpendicular line to the central axis along the groove having the spiral shape.

9. The rotary mixer according to claim 8, wherein the cross-sectional shape of the hollow part cut along the axis is a quadratic curve by $y=ax^2$ ($a>0$) with the perpendicular line as the x-axis, the axis as the y-axis and the vertex as the origin.

10. The rotary mixer according to claim 9, wherein the rotary mixer includes a pressure-resistant structure increasing a pressure inside the hollow part by including the inflow hole and the discharge hole that are narrow relative to the volume of the hollow part.

11. The rotary mixer according to claim 8, wherein the material of the rotary mixer is iron.

12. A bubble shear filter including a cylindrical hollow part, an inflow hole for introducing a fluid containing bubbles into the hollow part and a discharge hole for discharging the fluid in the hollow part to the outside of the hollow part comprising:

a type 1 of plate being a circular plate and arranged inside the hollow part; and a type 2 of plate being a circular plate and arranged on a downstream side the type 1 of plate; wherein the type 1 of plate is provided with a plurality of openings, the type 2 of plate is provided with a plurality of pointed end portions (mountains) protruding from the downstream side toward an upstream side and a plurality of openings (valleys) surrounded by the adjacent pointed end portions, the opening of the type 1 of plate and the opening of the type 2 of plate face each other, and the entire pointed end portion of the type 2 of plate is located downstream of the opening of the type 1 of plate.

* * * * *